Patented Mar. 22, 1938

2,111,911

UNITED STATES PATENT OFFICE 2,111,911

PROCESS FOR PREPARING IMPROVED ACID DERIVATIVES OF HYDROCARBON OILS AND PRODUCTS THEREOF

Stewart C. Fulton and Hans G. Vesterdal, Elizabeth, N. J., assignors to Standard Oil Development Company, a corporation of Delaware No Drawing. Application June 2, 1934, Serial No. 728,770

13 Claims. (Cl. 260—99.12)

This invention relates to methods for preparing improved derivatives of hydrocarbon oils with strong mineral acids and to the products thereof, and more particularly to the production of improved wetting agents and detergents.

The treatment of hydrocarbon oils with strong and fuming sulfuric acid and sulfuric anhydride for the purpose of producing refined oils has long been known. The sulfuric derivatives so formed and the salts thereof have been used as wetting agents, detergents, fat splitting agents, tanning agents, emulsifying agents, de-emulsifiers, and for other purposes. The quality of these sulfuric derivatives is substantially increased by conducting the oil-acid reaction at low temperatures, usually below 50° F. and preferably below 40° F. and even 20° F. or 10° F. when using strong sulfuric reagents such as concentrated sulfuric acid, fuming acid and sulfuric anhydride.

It has now been found that a still further improvement in the quality of the sulfuric derivatives is obtained if precautions are taken to keep the acid-oil reaction mixture at or below the treating temperature until the strong sulfuric reagent is removed. It is preferable that the temperature of the reaction mixture be not allowed to rise above the treating temperature until all free sulfuric anhydride has been completely removed and the strength of the free sulfuric acid remaining has been reduced below about 80% and preferably to between 30 and 60%. This strength of acid is based on the total amounts of free acid and water present in the reaction mixture. The reduction in the strength of the acid in contact with the organic reaction products may be accomplished by neutralization with suitable bases, by dilution with water, by selective solvents to remove the acid or the organic compounds, by any combination of such means, or by any other means effective to eliminate free acid and to decrease its capacity to cause further reaction with the initial materials or the components of the reaction mixture. Since such neutralization and dilution operations result in a marked evolution of heat it is necessary either to pre-chill the reagents or diluents or both to a very low temperature or else to supply positive cooling continuously during the reduction in strength of the acid.

This invention may be used to prepare improved sulfuric derivatives, detergents, wetting agents, and the like, from all types of hydrocarbon oils of preferably above about 8 carbon atoms per molecule and which undergo reaction with strong sulfuric reagents at low temperatures. Aromatic, naphthenic and mixed base petroleum oils, and products obtained therefrom by distillation, extraction, cracking, dehydrogenation, destructive hydrogenation, limited oxidation, or any combination of such processes are suitable for treatment with strong sulphuric reagents according to this invention. Also suitable are the acid reactive fractions obtained from paraffin wax, petrolatum, paraffinic oils and white oils by cracking, dehydrogenation, destructive hydrogenation, limited oxidation, and like processes. Synthetic acid reactive oils, such as are obtained by polymerization of normally gaseous and light liquid olefines by any suitable polymerization and/or condensation method, for example using acid or halide catalysts and/or contact surfaces, high pressures and temperatures, may also be used.

The sulfuric derivatives obtained in the acid-oil reaction are believed to be in the form of sulfonic acids or sulfuric esters or mixtures of both. These derivatives may be separated from the reaction mixture according to the present invention in the form of the acids and acid esters or they may be neutralized with suitable bases during the neutralization of the free sulfuric acid or after separation therefrom and may be obtained in the form of salts or soaps. Both types of products are markedly superior to the sulfonic acids, sulfonates, etc., obtained in the ordinary treating of hydrocarbon oils with sulfuric acid.

The sulfuric derivatives obtained by this invention from hydrocarbons and products thereof having a relatively long and straight chain of about 10 to 18 or more carbon atoms, with few and preferably short branches, may be used to prepare highly effective detergents by neutralization with suitable bases, such as the basic compounds of the alkalies and ammonia. Suitable stocks for the preparation of the acid derivatives are those obtained by cracking and/or dehydrogenation of paraffins, such as paraffin wax and petrolatum, preferably under conditions avoiding polymerization and rearrangement of the unsaturated products formed. The use of such stocks, particularly cracked paraffins, in the preparation of soaps of sulfuric derivatives thereof as detergents, is claimed in copending application Serial No. 704,749, filed December 30, 1933, by William J. Sweeney. The calcium salts of these derivatives are soluble in water, permitting the use of the detergents in hard waters and even in sea water. In fact, the detergent properties of these derivatives are often improved by the presence of electrolytes, such as salts of metals, which do not form insoluble compounds therewith. Examples of such salts are the sulfates, bisulfates, carbonates, phosphates, chlorides, acetates, borates, etc. of the alkali, alkaline earth, and earth metals generally, such as ammonium, sodium, potassium, magnesium, calcium, strontium, barium, aluminum, boron, zinc, cadmium, mercury, tin and other metals capable of forming water soluble or water dispersible compounds of the sulfuric derivatives. The polyvalent metals are generally preferred for this use. Compounds having adverse physiological effects should obviously not be used in preparing soaps to be used in contact with living organisms. The salts of the weaker acids, such as the borates, acetates and salts of other organic acids, also serve as buffers to prevent the development of acidity in the event that the detergents may contain readily hydrolyzable sulfuric derivatives. Detergents may also be prepared by using basic compounds of the above metals to neutralize wholly or partly the sulfuric derivatives. The magnesium soap of the sulfuric derivatives of cracked wax, for example, is a particularly effective detergent.

The detergents having about 18 or more carbon atoms in the chain dissolve only slowly in water, but can be dissolved or dispersed much more readily in the presence of a small amount of oil soluble sulfonates or other suitable emulsifying agents, or on addition of a few percent of an alcohol to the water. These solution aids may be added separately to the bath or may be mixed with the detergents, and the emulsifying agents are used preferably in a minor proportion to the detergents in either case.

The sulfuric derivatives obtained by this invention from hydrocarbons of more than about 8 carbon atoms per molecule and having a more branched or a ring structure, such as the naphthenes, aromatics and polymerized oils, do not produce as effective detergents as those described above, but are much superior thereto as wetting agents, emulsifiers, etc. These sulfuric derivatives may be obtained, for example, from aromatic and naphthenic oils, such as the lubricating distillate fractions of aromatic and naphthenic crudes and from other acid reactive virgin or cracked normally liquid petroleum fractions. The cracking may be conducted in liquid or vapor phase, at reduced, atmospheric or increased pressures and may be once through or cyclic. It is preferably conducted under conditions favoring the production of unsaturated products, and with as little polymerization and condensation as possible, for example, by a quick passage through a narrow cracking tube. More highly cracked stocks, however, such as cycle stocks which have been repeatedly cracked, may also be used. These derivatives of branched and cyclic hydrocarbons are superior wetting, dispersing and emulsifying agents having extended use in dye baths, miscible oils, emulsions, and the like.

The following examples are presented to illustrate suitable methods for conducting the process of this invention:

*Example 1*

A fraction of cracked petrolatum distilling between 360 and 600° F. is obtained in an atmospheric pressure batch destructive distillation. 36 liters of this distillate, containing about 35% of olefines, are treated at about 12 to 20° F. with 7 kilograms of fuming sulphuric acid containing 20% sulphuric anhydride, by slow addition of acid with cooling and vigorous agitation during about three hours agitation. The acid is then neutralized by careful addition of sodium hydroxide with continued agitation and cooling to maintain the temperature below 20° F. until the sulphuric acid strength is below about 60%. On completion of neutralization, 18 liters of isopropyl alcohol are added with stirring and the mixture is allowed to stand. Three layers then form, a lower aqueous layer of mineral salts, a middle alcoholic layer containing most of the sodium soaps of the sulphuric acid derivatives formed, and an upper oily layer of unreacted hydrocarbons containing some soap. The three layers are separately withdrawn. The soap is extracted from the upper layer with 50% aqueous isopropyl alcohol, and the extract is added to the middle layer. Sufficient ammonia is added to this solution to maintain a slight excess of ammonia throughout the following drying operation. The alcohol solution is then evaporated to dryness on a drum dryer, at a temperature of about 120° F. There are then obtained 4.5 kilograms of soap, which consists largely of sodium salts of sulphated olefines. This soap is of a very light amber color, and gives practically colorless aqueous solutions in concentrations suitable for washing and laundering purposes, say 0.2 to 0.5%. The soap is a highly effective detergent and is effective in soft or hard water.

*Example 2*

A similar fraction of cracked paraffin wax prepared as described in Example 1 is used to prepare a sodium soap by the same procedure there used. From 22 liters of the cracked wax fraction is obtained 6.6 kilograms of soap, using only 4.5 kilograms of fuming sulphuric acid. This soap is superior in laundering characteristics even to that prepared from cracked petrolatum in Example 1, and shows substantially better sudsing and cleaning characteristics in hard water.

*Example 3*

A Talang Akar crude oil was cracked by being passed once through a cracking zone maintained at a pressure of 250 pounds per square inch and a temperature of 850° F. The cracked gas oil obtained after distilling off the gasoline from the cracked product was further distilled to obtain a distillate fraction of 35° A. P. I., representing about 12% of the cracked gas oil. 100 c. c. of this distillate fraction was cooled to 5° F. and 200 grams of fuming sulfuric acid containing 20% sulfuric anhydride was added slowly with continued agitation and cooling to maintain the temperature of the reaction mixture at 5° F. The reaction mixture was then slowly diluted with cold water, with continued cooling to remove the heat formed on dilution and to maintain the temperature of the mixture below about 32° F., the temperature increasing roughly as the dilution progressed, to reduce the concentration of free sulphuric acid to about 60% (based on total free acid and water). The mixture was then allowed to settle and a lower aqueous layer of sulphuric acid formed and was removed. The upper layer was then neutralized by addition of a 15% aqueous solution of caustic soda and enough isopropyl alcohol was added to cause the formation of three separate layers, an upper oily layer, a middle alcoholic layer, and a lower aqueous layer. The top oil layer and the bottom aqueous salt solution layer were separately removed. The middle layer, containing the soaps of the sulfuric derivatives of the oil in solution in alcohol, was evaporated to remove the alcohol. There were thus obtained as evaporation residue 87 grams of a dry soap having wetting out properties equivalent to sodium salts of sulfated hexa- and octa-decyl alcohols and having good detersive properties.

*Example 4*

A Pennsylvania crude is fractionated by distillation and a fraction boiling above the kerosene range and having a Saybolt viscosity of about 100 seconds at 100° F. is separately collected. This fraction, called Rose oil, is dewaxed to obtain an oil having a pour point below about 0° F. The dewaxed oil is then treated at 10 to 20° F. with fuming acid as described in Example 3, and a soap of the sulfuric derivatives so formed is obtained from the reaction mixture in a similar procedure. The remaining oil fraction may be finished in the usual methods and used as a high quality white or medicinal oil. The soaps obtained have equal wetting out properties, and usually a somewhat less detersive action than those obtained from cracked oils as described in Example 3. Other crudes, including the Mid-Continent or mixed base and the naphthenic type crudes, may be similarly treated to prepare improved sulfuric derivatives therefrom. It is generally desirable in using such crudes to give the crude or the distillate fraction a preliminary treatment with concentrated sulfuric acid to remove asphaltic matter. The soaps then obtained according to the present invention are of improved quality and color.

The acid oil reaction may be conducted with strong or fuming acid or with sulfuric anhydride alone or with other suitable solvents or diluents. While the reaction may be carried out at a substantially uniform low temperature, it may be conducted to advantage by initially contacting the sulfuric reagent and the oil at a very low temperature, say 0° F. or even lower, and then permitting the mixture to warm up to the maximum temperature of about 20 to 50° F. desired. The oil may also be first mixed with a relatively weak sulfuric reagent, say a diluted sulfuric acid or a fuming acid of low concentration, and the strength of the sulfuric reagent may then be increased while in contact with the oil by the addition, preferably gradually, of a stronger sulfuric agent such as strongly fuming acid or sulfuric anhydride. This method of treatment is claimed in copending application Serial No. 704,757, filed December 30, 1933 by one of the present inventors. The milder preliminary treatment apparently serves to convert the more highly reactive components of the oil such as diolefines and tertiary olefines into more stable sulfuric derivatives, thereby avoiding the polymerization of these components occurring on their contact with stronger sulfuric reagents or with the same reagents at higher temperatures. Other suitable methods may also be used to remove such highly reactive components, if desired.

Other acid reaction materials or compounds may also be added to the petroleum oils before or during the acid treatment, and mixed sulfuric derivatives may be thereby obtained. Among such materials may be mentioned oxygen containing organic compounds such as fats and their corresponding acids and alcohols, oxygenated products of the limited oxidation of hydrocarbons such as petroleum, white oil and paraffin wax; coal tar distillates, ethers, esters, aldehydes, ketones and hydroxy organic compounds generally, phenols, naphthenic and other acids, thickened or polymerized animal and vegetable oils, resins, rosin, terpenes; also amines, sulfur compounds, halogenated compounds such as chlorinated wax; also aromatic compounds such as naphthalene, diphenyl, diphenyl oxide and other derivatives of aromatic compounds, and the like.

The cooling during either the acid-oil reaction or the subsequent neutralization or dilution steps or both may be conducted by either direct or indirect heat exchange with cooling liquids. For example, an inert diluent boiling at a low temperature, such as propane, butane or pentane or mixtures thereof, or other low boiling hydrocarbons, ether, carbon tetrachloride and other diluents which are inert or react only slowly with the sulfuric reagent, may be added to the hydrocarbon oils to be treated in sufficient amounts so that by evaporation it removes the heat generated in the reaction mixture and maintains the temperature thereof at any desired level. The temperature in such cases may be conveniently controlled by adjusting the pressure maintained on the reaction zone. Pressures above atmospheric may be used with the low boiling refrigerants, and pressures below atmospheric, even a high vacuum, may be used with high boiling refrigerants. Other refrigerants such as liquid sulfur dioxide may be used in place of or in conjunction with the liquefied hydrocarbon gases. The temperature of the dilution or neutralization step may also be suitably controlled below about 40 F. to 45° F. by conducting this step under vacuum, using water both as diluent and refrigerating agent.

The sulfuric derivatives may be neutralized with suitable bases to form soaps, emulsifiers, etc. either during or following the decrease in the strength of excess acid in the reaction mixture. If they are neutralized during this step, the heat of neutralization must be removed to maintain the mixture at the desired low temperature. Suitable bases include the oxides, hydroxides, carbonates and other basic compounds of the alkali and alkaline earth and other suitable metals, ammonium and the amines, alkyl amines, alkylol amines and other organic bases and mixtures of any such compounds. Liquid ammonia can be used both as a neutralizing agent and a refrigerant during this operation.

The sulfuric derivatives and the neutralized products thereof obtained from clean hydrocarbon oils, that is, free from asphaltic and tarry matter, will usually be of suitable color and purity for immediate use as wetting agents or detergents, etc., of high quality. However, if dirty stocks are used, or treating, neutralizing or drying temperatures are permitted to run too high, discolored products may result. These may be purified by treatment with clay, active carbon, by salting out of a saturated salt solution of sodium chloride or sulfate, for example, by the use of selective solvents, such as aqueous alcohols, for the soaps and/or preferably aromatic hydrocarbon oils and the like, for the tars; by treatment with peroxides, and other soap refining practices. The addition of soluble calcium or other alkaline earth or heavier polyvalent metal salts to an aqueous solution of discolored sulfuric derivatives or their corresponding alkali soaps also serves to precipitate color bodies. The precipitate may be removed by settling, centrifugation, filtration, dialysis, etc., and a light colored sulfuric derivative or soap recovered from the purified solution by drying, solvent extraction, salting out, and other methods.

In many cases the neutralized sulfuric derivatives contain unstable bodies, as evidenced by the development of acidity in aqueous solution of such derivatives on standing even at room temperature, and more rapidly on heating such solution to boiling. Such unstable bodies can be removed and the products rendered stable even on long continued boiling by the use of a limited hydrolysis treatment in which an aqueous or alcoholic solution of the soap containing a small amount of a hydrolyzing agent, preferably one or two percent of sodium hydroxide or other strong alkali, is heated to a suitable temperature to remove the unstable compounds, as described and claimed in copending application Serial No. 722,838 filed April 28, 1934, Patent No. 2,049,055, July 28, 1936, by the present inventors.

The amount of unstable compounds in the products can be greatly decreased by conducting the acid treating of the hydrocarbon oil and the subsequent removal of excess sulfuric reagent so as to keep the time of contact of oil and strong reagent to a minimum. The oil and sulfuric reagent may be contacted in a homogenizer rotating at high velocity, say 1,000 to 10,000 R. P. M., or by passing stream of oil and sulfuric reagent at a rapid rate through a zone containing mixing baffles. The excess reagent may then be removed by rapid dilution and/or neutralization and/or by the use of a centrifuge to separate phases of different density.

In case it is not desired to stabilize completely the products, the development of acidity therein and diminution in yield can be prevented by conducting the drying operation in the presence of a slight excess of alkali, as described and claimed in copending application Serial No. 704,790, filed December 30, 1933 by Hans G. Vesterdal.

The sulfuric derivatives and the neutralized products or soaps obtained therefrom, are suitable for use as valuable detergents or wetting agents, according to their composition, as described above. They may also be used as tanning agents, emulsifiers, emulsion breakers, and generally in whole or partial substitution for ordinary fat acid soaps and for the "green", or water soluble, sulfonates. They may also be used in admixture with other wetting agents and detergents, such as the ordinary petroleum acid sludge sulphonates, the sulphates of fatty alcohols, hydroxy acids and the like, fatty acid soaps, alkalies such as washing soda and ammonia, fillers, abrasives, dyes, perfumes, organic solvents and other addition products in the preparation of wetting and cleansing compositions, laundry and toilet preparations, bar soaps, soap powders, liquid soaps, dry cleaner soaps, and like compositions.

These sulfuric derivatives may also be used generally as improved substitutes for the water soluble sulfonic acids and sulfonates heretofore obtained from acid treating of petroleum oils under ordinary conditions.

This invention is not to be limited to any illustrations, examples or theoretical explanations which have been presented herein solely for purpose of illustration, but is limited only by the following claims in which it is desired to claim all novelty insofar as the prior art permits.

We claim:

1. Process for preparing improved wetting agents and detergents, comprising treating an acid reactive petroleum oil fraction of more than eight carbon atoms per molecule with fuming sulfuric acid at a reaction temperature below about 50° F. to produce a sulfuric derivative of a reactive component of said oil, reducing the strength of free sulfuric acid in the reaction mixture to below about 60% while maintaining the temperature of the reaction mixture continuously below about 50° F. and neutralizing the said sulfuric derivative with a suitable base to form a water soluble product thereof.

2. Process according to claim 1 in which the said petroleum oil is a virgin oil.

3. Process according to claim 1 in which the said petroleum oil is a virgin distillate fraction and the said reaction temperature is maintained below about 20° F.

4. Process according to claim 1 in which the said petroleum oil is a cracked fraction of petroleum oil.

5. Process according to claim 1 in which the said petroleum oil is a cracked gas oil and the said reaction temperature is maintained below about 10° F.

6. Process for preparing improved wetting agents and detergents comprising reacting an acid reactive petroleum fraction of more than eight carbon atoms per molecule with an excess of fuming sulfuric acid at a temperature below about 50° F., reducing the strength of free sulfuric acid in the reaction mixture to below about 60% while maintaining the temperature of the reaction mixture continuously below about 50° F. and neutralizing the resulting sulfuric derivatives with a suitable base to form a water soluble product thereof.

7. Process for preparing improved detergents comprising treating a mixture of olefins of more than eight carbon atoms per molecule obtained by cracking a paraffin with fuming sulfuric acid in excess at a reaction temperature below about 40° F., reducing the strength of the free sulfuric acid in the reaction mixture to below about 60% while continuously maintaining the temperature of the reaction mixture below about 40° F. and neutralizing the resulting sulfuric derivatives with a suitable base to form a water soluble product thereof.

8. Process for preparing improved detergents comprising treating a mixture of olefins of more than eight carbon atoms per molecule obtained by cracking paraffin wax, with fuming sulfuric acid in excess at a reaction temperature below about 40° F., reducing the strength of the free sulfuric acid in the reaction mixture to below about 60% while continuously maintaining the temperature of the reaction mixture below about 40° F. and neutralizing the resulting sulfuric derivatives with a suitable base to form a water soluble product thereof.

9. Process for preparing improved detergents comprising treating a mixture of olefins of more than eight carbon atoms per molecule obtained by cracking petrolatum, with fuming sulfuric acid at a reaction temperature below about 20° F., reducing the strength of free sulfuric acid in the reaction mixture to below about 60% while maintaining the temperature of the reaction mixture continuously below about 20° F. and neutralizing the resulting sulfuric derivatives with a suitable base to form a water soluble product thereof.

10. Improved wetting agent and detergent comprising salts of sulfuric derivatives of acid reactive petroleum oils prepared according to claim 1.

11. Improved detergents comprising salts of sulfuric derivatives of cracked paraffin prepared according to claim 7.

12. Improved detergents comprising salts of sulfuric derivatives of cracked paraffin wax prepared according to claim 8.

13. Improved detergents comprising salts of sulfuric derivatives of cracked petrolatum prepared according to claim 9.

STEWART C. FULTON.
HANS G. VESTERDAL.